United States Patent
Leppla et al.

(10) Patent No.: US 7,885,539 B2
(45) Date of Patent: Feb. 8, 2011

(54) METHOD FOR DETECTING AND LOCALIZING FAULTS IN AN OPTICAL TRANSMISSION PATH, AND OPTICAL TRANSMISSION SYSTEM

(75) Inventors: Ralph Leppla, Darmstadt (DE); Malte Schneiders, Darmstadt (DE); Sascha Vorbeck, Griesheim (DE); Werner Weiershausen, Eppertshausen (DE); Frank Rumpf, Darmstadt (DE); Matthias Gunkel, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 640 days.

(21) Appl. No.: 11/636,312

(22) Filed: Dec. 8, 2006

(65) Prior Publication Data

US 2007/0274712 A1    Nov. 29, 2007

(30) Foreign Application Priority Data

Dec. 8, 2005 (EP) .................................. 05026788

(51) Int. Cl.
*H04B 10/08* (2006.01)
*H04B 17/00* (2006.01)

(52) U.S. Cl. ............................................. 398/13
(58) Field of Classification Search .............. 398/20, 398/25, 28, 17, 152, 10, 34, 40; 359/110, 359/112, 109, 119, 155, 156
See application file for complete search history.

(56) References Cited

U.S. PATENT DOCUMENTS

| | | | | |
|---|---|---|---|---|
| 5,381,257 A | | 1/1995 | Ferrar et al. | |
| 5,485,296 A | * | 1/1996 | Healey et al. | 398/40 |
| 5,712,641 A | * | 1/1998 | Casabona et al. | 342/362 |
| 6,317,231 B1 | * | 11/2001 | Al-Salameh et al. | 398/34 |
| 7,079,764 B2 | * | 7/2006 | Saunders | 398/10 |
| 2003/0086144 A1 | | 5/2003 | Chou et al. | |
| 2005/0002017 A1 | | 1/2005 | Haran et al. | |

FOREIGN PATENT DOCUMENTS

| | | |
|---|---|---|
| CA | 2 229 219 | 8/1999 |
| CA | 2229219 A1 * | 8/1999 |

OTHER PUBLICATIONS

Poole C.D., Polarization Dispersion and Principal States in a 147-km Undersea Lightwave Cable, Jul. 1988, Journal Of Light Technology, vol. 6 No. 7, pp. 1185-1190, IEEE 1988.*
Wuttke, Joachim, "Polarization Oscillations in Aerial Fiber Caused by Wind and Power-Line Current", Jun. 2003, IEEE Photonics technology Letters, vol. 15, No. 6, pp. 882-884.*
Joachim Wuttke et al, "Polarization Oscillations in Aerial Fiber Caused by Wind and Power-Line Current," IEEE Photonics Technology Letters, IEEE Service Center, New Jersey, vol. 15, No. 6, Jul. 6, 2003.

* cited by examiner

*Primary Examiner*—Shi K Li
(74) *Attorney, Agent, or Firm*—Kenyon & Kenyon LLP

(57) ABSTRACT

A method for detecting and locating faults in an optical transmission path, and to an optical transmission system having such a functionality, is provided. By measuring the temporal change in the state of polarization SOP, external influences on a glass fiber cable of a long-haul transmission system, e.g., a WDM transmission system, may be detected. Such fault(s) may be localized with the aid of the relative arrival time of the polarization signal at both sides of a bidirectional transmission system.

16 Claims, 4 Drawing Sheets

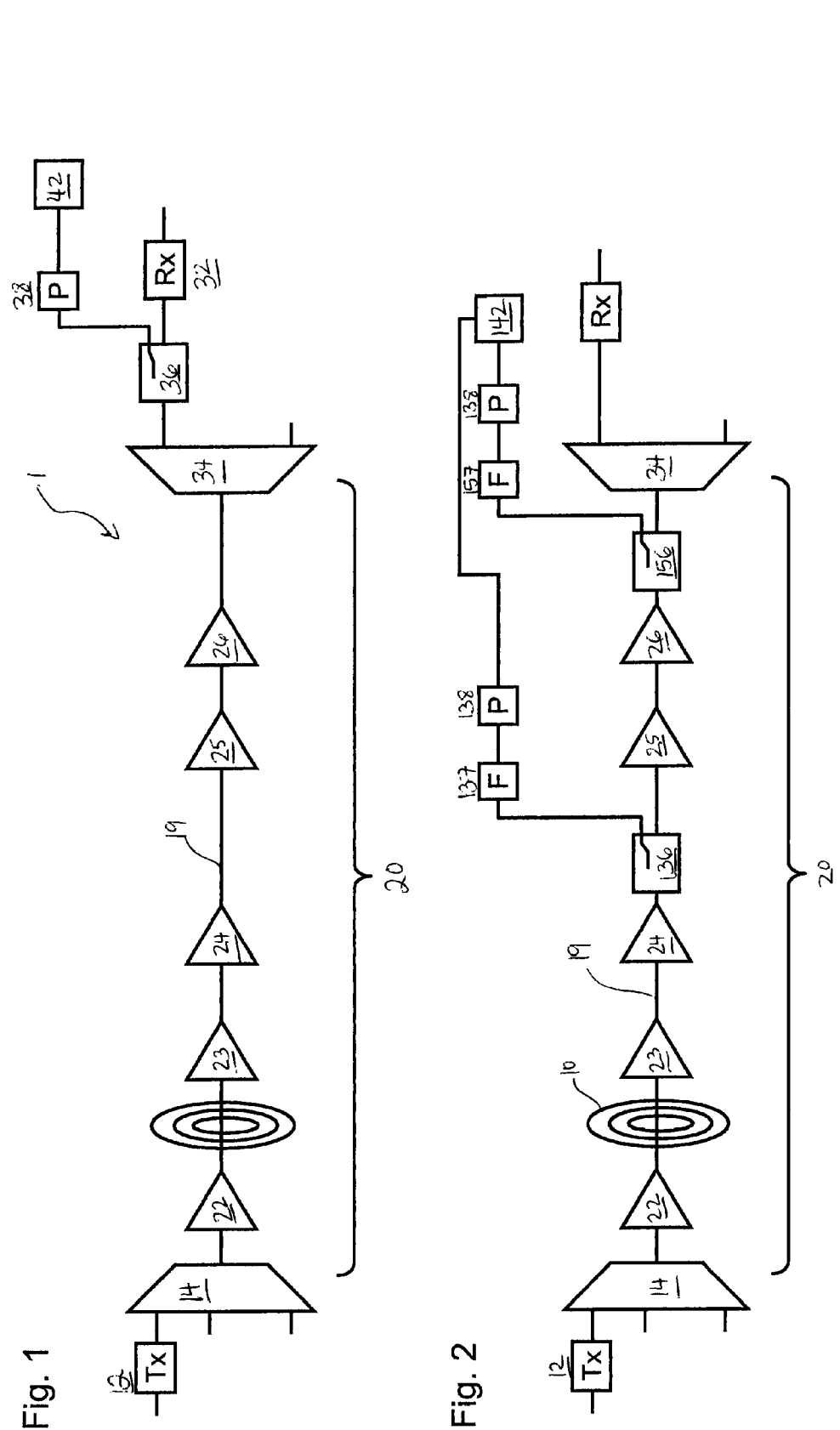

METHOD FOR DETECTING AND LOCALIZING FAULTS IN AN OPTICAL TRANSMISSION PATH, AND OPTICAL TRANSMISSION SYSTEM

FIELD OF THE INVENTION

The present invention relates to a method for detecting and localizing faults in an optical transmission path, and to an optical transmission system having such a functionality.

BACKGROUND INFORMATION

The importance of optical data transmission, especially across long distances, has grown enormously over the past few decades.

Long-range, so-called wave division multiplex systems (WDM) having optical amplifiers form the basis of high-capacity transmission networks, so-called backbone networks, in the long-distance range. In a WDM system, a multitude of carrier signals having different wavelengths is transmitted simultaneously via the same optical fiber. Typical distances that are able to be bridged in an optically transparent manner are in the range of 200 km to 2000 km. Optical transmission systems are utilized to guide the data to the backbone networks; these optical transmission systems are likewise based on glass fiber and are partly based on WDM technology as well, but otherwise transmit only one optical channel per glass fiber in most cases. The connection network and feed are jointly based on a tightly meshed glass fiber infrastructure having typical "radii of the network meshes" of 2 to 7 km. The glass fibers may be installed subterraneanously, i.e., in the ground, or above ground such as across bridges, on the floor of bodies of water, in particular trans-oceanically or in unsupported fashion.

For example, in the case of a subterranean glass-fiber infrastructure, the glass-fiber cables may be destroyed by external causes. A main cause of such destruction can be construction work. However, mechanical influences that have a potentially destructive effect on cables may occur even in the case of submarine cables.

One may determine faults in a fiber with the aid of so-called available optical time domain reflectrometry (OTDR). In the process, a signal is sent into the fiber and its reflections are measured. However, this method has a low sensitivity. And, faults can be detected only once the fiber has already sustained significant damage. Furthermore, OTDR may be employed to check only short sections of a transmission path, typically up to a maximum of 50 km, due to the fact that work between the amplifiers may be carried out only sectionally because of the reflection measurements.

SUMMARY OF THE INVENTION

Embodiments of the present invention provide a method and a transmission system which may detect influences on or faults in the transmission path, including, for example, before they have a destructive effect on the optical fiber.

Embodiments of the present invention may provide a method and a transmission system which are not only able to detect such influences or faults but localize them as well.

Embodiments of the present invention may provide a simple, cost-effective and sensitive method, as well as a means by which existing, already installed transmission systems may be retrofitted accordingly.

Embodiments of the present invention may provide, in a simple manner, a method for detecting faults in a transmission path, having at least one optical fiber, of an optical transmission system, wherein light having an input state of polarization is injected into the transmission path at a first location of the transmission path; the light is decoupled at a second location of the transmission path, the first and second location being spaced apart from each other, so that the light decoupled at the second location has passed through at least one section of the transmission path; the state of polarization (SOP) of the decoupled light is measured in a manner resolved as to time, the temporal change in the state of polarization of the decoupled light is determined; and an external influence on the optical fiber is detected in response to the temporal change in the state of polarization of the decoupled light.

Embodiments of the present invention may include a method for locating external influences on a bidirectional fiber-optic transmission system having a separate transmission path for the forward direction and the return direction, wherein light is decoupled at a first location, lying downstream from the signal, of the transmission path of the forward direction and is decoupled at a second location, lying downstream from the signal, of the transmission path of the return direction, the decoupled light in each case having passed through at least one shared section of the transmission system in the forward direction and the return direction; the state of polarization (SOP) of the decoupled light is measured in a manner resolved as to time for the forward direction and the return direction; an external influence on the transmission system is detected in response to a temporal change in the state of polarization for the forward direction and the return direction; and the location of the influence along the transmission path is calculated in response to the arrival times ($t_1$, $t_2$) of the temporal change for the forward direction and the return direction.

Embodiments of the present invention may provide for an optical transmission system having at least one fiber-optic transmission path, having a transmitter and a receiver for transmitting optical signals via the optical fiber, and means for applying the method as recited in one of the preceding claims, including: a coupler for the decoupling of light from the transmission system after it has passed through at least one section of the transmission path; a polarization measuring device, connected to the coupler for measuring the state of polarization (SOP) of the decoupled light in a manner resolved as to time; and an evaluation device connected to the polarization measuring device, which includes means for automatically detecting temporal changes in the measured state of polarization, and means for detecting external influences on the transmission path in response to the temporal changes in the measured state of polarization.

In embodiments of the present invention, faults, e.g., external mechanical influences acting on a transmission path of a long-haul optical transmission system, may be detected in the following manner: at least partially polarized light having an input state of polarization is coupled into the transmission path at a first location of the transmission path.

The light is decoupled again at a second location of the transmission path, the first and second location being located at a mutual distance from each other so that the light decoupled at the second location has passed through at least one section of the transmission path in order to detect the faults in the traveled section.

At the second location, the state of polarization of the decoupled light is measured in a manner resolved as to time, and the temporal change in the state of polarization of the decoupled light is determined.

In embodiments of the present invention, an evaluation device is used, e.g., in an automated manner. An external action on the optical fiber may be detected in response to the temporal change in the measured state of polarization of the decoupled light.

This may make it possible to detect faults in a time-resolved manner while the transmission system is still optically transparent, i.e., before the cable and/or fiber is cut.

In further embodiments, the polarization measurement may respond to small influences, so that, for example, slight vibrations as caused by excavation work may be verified at an early stage in this manner. Changes in the state of polarization at the output of the transmission path may be caused not only by mechanical influences but also by temperature changes along the path. In further embodiments, displacement of the cable by the action of waves, for example, may lead to measurable, but slow changes in the polarization. In embodiments where glass-fiber cables are installed without support, even slight external influences such as wind may lead to large changes in polarization. These changes, too, may be basically detectable and verifiable by embodiments of the present invention. This is due to the fact that, in embodiments of the present invention, the state of polarization (SOP) at the output of an optical transmission path responds to influences acting on the glass fiber along the optical path in a very sensitive manner. The high sensitivity of the glass fiber with respect to faults may be attributable to the mode-coupling effect between the different polarization directions. Due to the phase sensitivity of the interference in mode coupling, a glass fiber therefore constitutes a multi-interferometer. Given a constant input polarization of the transmission system, the change in the output polarization may be described by the change in the transmission matrix in the sense of a two-dimensional, frequency-dependent transmission function.

Embodiments of the present invention may be implemented across very long transmission paths, for example, via the amplifiers provided in the transmission path.

In embodiments of the present invention, the state of polarization of the decoupled light may be measured continuously. Predefined parameters, which are a measure for the state of polarization, may be determined as a function of time. Thus, constant monitoring of the transmission path and possibly a recording of the events may be possible. The type of fault may be inferred on the basis of the time characteristic of the state of polarization function. This has proven to be useful to determine the Stokes parameters of the state of polarization of the decoupled light to obtain a generally customary complete representation of the elliptical polarization of the light.

In embodiments of the present invention, one may implement a Fourier analysis of the Stokes parameters for the purpose of determining the included frequency components, and then to implement filtering according to predefined frequency components. In embodiments of the present invention, for periodic or slow faults, e.g., wind and/or the motion of waves in the case of unsupported cables or cables laid on the ocean floor, may be able to be filtered out in the Fourier spectrum. In embodiments of the present invention, the cause may even be determined on the basis of the frequency of the fault. Even temperature-related effects may be separated from polarization changes related to mechanics on the basis of the different time constants. This may be due to the fact that the thermal capacity of the transmission medium (glass fiber plus cable) may cause temperature-related polarization changes to take place very slowly.

In embodiments of the present invention, it can be sufficient to measure only the amplitudes of the Stokes parameters since they are already a measure for the intensity of the fault.

This analysis may be realized very easily. One example field of use for embodiments of the present invention is a WDM system.

In an embodiment of the present invention, the optical signals utilized for the transmission of information may be used as the light for measuring the state of polarization, because the optical signals are transmitted in the form of polarized light. To this end, a portion of the output of the optical signals used for the transmission of information, i.e., available anyway, may be decoupled at the second location, and the state of polarization of the optical signals thus measured after passing through the at least one section of the transmission path or measuring path. In such embodiments, the optical signals used for the transmission of information represent the injected light. Such embodiments require no separate light source; instead, only a small portion of, for example, less than 10%, or even approximately 1%, the data signal is decoupled.

In embodiments of the present invention, one may inject the light for implementing the polarization measurement, i.e., the polarization measuring light, at the first location by means of a separate laser, for example, in continuous light operation, in addition to the optical signals. This may allow the full power of the laser to be decoupled again and used for the measurement, so that after decoupling a high light output may be available for the polarization measurement. The wavelength of the laser may lie in the amplifier band of the transmission system, so that the measurement is able to be carried out across very great distances of up to a few thousand kilometers in length.

Even in a WDM system, the polarization measuring light or measuring signal may be injected or decoupled at any desired location within the transmission path, e.g., also between multiplexer and demultiplexer. In this case, an optical filter is connected downstream from the coupler. An example location for injecting and decoupling is the location of an optical amplifier within the transmission path.

In embodiments of the present invention, e.g., in a WDM system, one may inject the polarization measuring light directly at the multiplexer and/or decouple it again directly at the demultiplexer. This dispenses with separate filters. In embodiments of the present invention, the light for measuring the state of polarization may be simply injected directly at the input of the multiplexer with the aid of a decoupler, and decoupled directly at the output of the demultiplexer with the aid of an additional optical coupler.

In embodiments of the present invention, for the time-resolved measurement of the state of polarization (SOP), embodiments of the present invention may use a polarizer to which a photo diode has been post-connected. The photo diode may be operated with the aid of an oscilloscope. The use of a so-called polarimeter, which measures all components of the polarization, e.g., in their Stokes representation, has proven to be useful. Such polarimeters having high time resolution may be available in the market. In embodiments of the present invention, the changes in the state of polarization may be calculated by analyzing the change in the polarization over time, e.g., the Stokes parameters, or, in a simple realization variant, by analyzing the measured output at the photo diode downstream from the polarizer.

Embodiments of the present invention may include a transmission system encompassing a plurality of transmission paths. In such embodiments, the method according to the present invention may used on all transmission paths. Further, a separate polarimeter may be employed. Polarization measuring light is decoupled from each transmission path and the state of polarization of the particular polarization measuring light is measured in a manner resolved as to time. If the polarimeters are synchronized with the aid of a shared clock pulse supply, a time correlation between the states of polarization at the polarimeters may be determined, allowing for inferences regarding the spatial extension and the type of fault.

In embodiments of the present invention, faults are not only able to be detected but localized as well. That is to say, if the transmission system has a bidirectional configuration, the states of polarization may be measured in a manner resolved as to time at both sides of the transmission system, i.e., once for the forward direction and once for the return direction, using, e.g., a separate polarimeter in each case. Furthermore, the two polarimeters may be synchronized as to time, and the location of the external action along the transmission path may be calculated in response to the relative arrival time, e.g., the time differential, of an identifiable rapid change in the state of polarization at the two sides of the measuring path. In addition to the time differential, only knowledge of the overall length of the measuring path and the transmission speed of the optical fiber are required.

To synchronize the two polarimeters at both ends, the normal cycle of the transmission system, a GPS signal or a radio signal may be used.

The field of application of the method according to the present invention may be largely determined by the sensitivity of the glass fiber or the glass fiber cable with respect to external interference. The following sensitive elements may be essentially located in the transmission path:

the installed glass fiber
underground
suspended in the air without support
under the sea;
the optical amplifiers;
modules for compensating distortion, e.g., dispersion-compensating fibers to compensate for the chromatic dispersion;
sleeves at the transitions between buildings and installed cables; and
transition cables (so-called patch cords) to connect the system via plug connections, essentially inside buildings. In embodiments of the present invention, the optical components, may be able to cause changes in the polarization. The mechanical configuration and the related thermal capacity or insulation of the optical components determine the sensitivity of the components/network elements with respect to external influences. High thermal capacity leads to smoothing of rapid temperature changes. A mechanical protection against external influences reduces the transmission of mechanical influences to the component. As a result, glass fiber cables laid underground in conjunction with mechanically reliably protected components are very suitable for the method according to the present invention.

In connection with measuring direct faults in the transmission path outside of buildings or protective boxes through which the transmission system passes, the design of the glass fiber cable affects the sensitivity of the system with respect to the faults. In the case of cables installed underground, the mechanical coupling between cable sheathing and glass fiber also may determine the sensitivity of the system. Systems having a friction-locked connection between glass fiber and cable sheathing and the currently employed so-called "loose tubes" may differ in their sensitivities.

Features of the embodiments described herein may be combined with each other.

BRIEF DESCRIPTION OF THE DRAWINGS

FIG. 1 shows a schematic representation of a transmission system having a polarimeter at the location of the receiving signal, the data signal being used as a measuring signal, according to an embodiment of the present invention.

FIG. 2 shows a schematic representation of a transmission system having two polarimeters provided at the location of the optical amplifiers according to an embodiment of the present invention.

BRIEF DESCRIPTION

Figure 3:
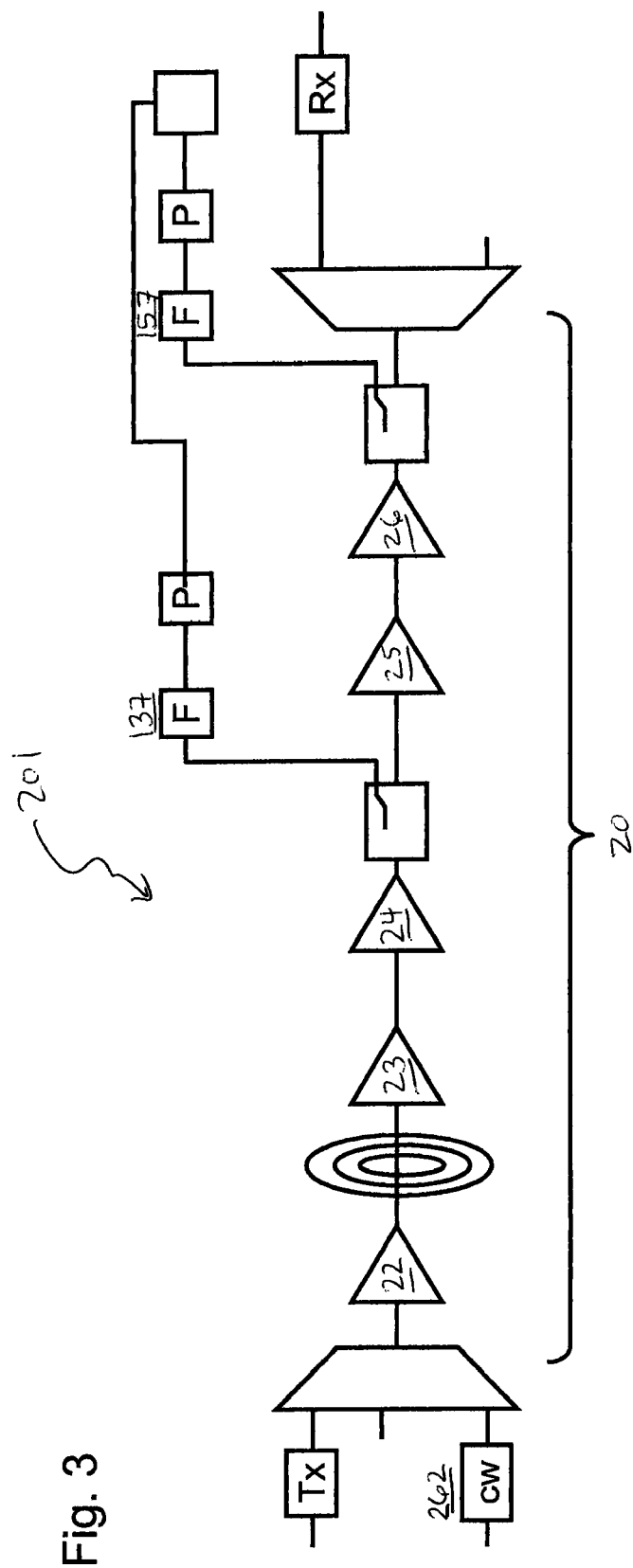
FIG. 3 shows a schematic representation of a transmission system having a CW laser for generating and injecting polarization measuring light according to an embodiment of the present invention.

FIG. 1 shows an example of a transmission system 1 having functionality according to the present invention. The data signals are multiplexed with a multitude of transmitters, of which only one transmitter 12 is shown, using a multiplexer 14, and transmitted via fiber 19, i.e., transmission path 20. Transmission path 20 may be a few hundred or even a few thousand kilometers in length. The data signal is boosted at predefined intervals by means of amplifiers 22 through 26 in transmission path 20. The distance between the amplifiers may typically be on the order of magnitude of 50 km. The number of amplifiers is an example. At the end of transmission path 20 the bundled signals are de-multiplexed again with the aid of a de-multiplexer 34, and received by receivers, of which only one receiver 32 is shown.

In this embodiment, a portion of the signals used for the transmission of information is decoupled directly at the output of de-multiplexer 34 in front of receiver 32 by means of an optical coupler 36, and forwarded to a polarimeter 38. A conventional polarimeter of the A1000 type by the firm Adaptif Photonics was used for the tests. It has sufficient time resolution for the measurements. Tests have shown that an input signal of approximately −30 dBm is sufficient for polarimeter 38. This corresponds to approximately 1% of the data signal. Using a computer-based evaluation device 42 connected to polarimeter 38, further analysis of the time function of the state of polarization is implemented. In this example, the data signal injected into transmission system 1 or transmission path 20 by transmitter 12, which is used for the transmission of data and based on polarized light, represents the injected light utilized for the polarization measurement. That is to say, a portion of the signals used for the transmission of information as it is, is utilized to decouple and measure the polarization at demultiplexer 34.

In the case of installed WDM systems, the polarization may be measured at any point in the transmission path.

FIG. 2 shows an exemplary embodiment of transmission system 101 according to the present invention. The polarization measuring signal is not decoupled from fiber 19 downstream from demultiplexer 34, but at two points within transmission path 20, between multiplexer 14 and demultiplexer 34. Individual optical couplers 136, 156 may be installed in the transmission path for the purpose of decoupling the polarization measuring signal at the location of amplifiers 24 and 26. An optical filter 137, 157 filters the decoupled signal to filter out the signal from a specific transmitter, in this example, transmitter 12. Filters 137, 157 are connected to polarimeters 138, 158, respectively, which forward the state of polarization of the polarization measuring light to a shared evaluation device 142. Due to the polarization measurement at the two different locations of amplifiers 24 and 26 in the transmission path, this embodiment makes it possible to already determine whether a fault 10 has occurred between transmitter 12 and amplifier 24 (illustrated case) or between amplifier 24 and amplifier 26 (not illustrated).

FIG. 3 shows another embodiment of transmission system 201 according to the present invention. A separate, non-modulated laser 262 operating in continuous light operation (so-called continuous wave operation or CW operation) is used instead of the optical data signal utilized for the transmission of information. The wavelength of laser 262 lies within the amplifier band of amplifiers 22 through 26. The decoupling of the polarization measuring signal takes place analogously to the embodiment in FIG. 2. The filter frequency of filters 137, 157 may be adapted to the laser frequency.

Figure 4:
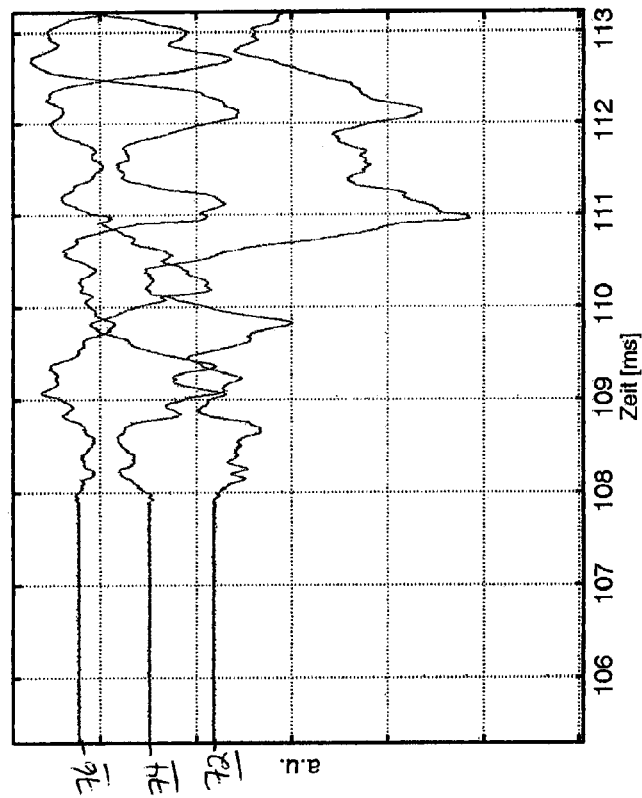
FIG. 4 shows an exemplary result of a time-resolved measurement of the Stokes parameters at the output of a glass fiber to detect a fault induced on the transmission system.

FIG. 4 shows an example of the measuring signal emitted by the example polarimeters illustrated in FIGS. 1 to 3. Illustrated are three Stokes parameters 72, 74 and 76 in random units of intensity (Y-axis) as a function of time (X-axis). Starting with the value of 108 ms on the X-axis, a rapid temporal change in all three Stokes parameters 72, 74, 76 can be detected. This is caused by a fault 10 induced on the transmission system, which is able to be detected with the aid of the Stokes parameter functions.

For a detailed analysis and typing of the nature of polarization changes, the temporal polarization changes, in this example in the form of Stokes parameters 72, 74, 76, may be analyzed using methods for signal analysis. Possible methods are, for instance:

subsequent Fourier analysis of the Stokes parameters and filtering of the included frequency components, where periodic faults in the transmission path or glass fiber path 20, for example, may be filtered out; and analysis of the amplitudes of Stokes parameters 72, 74, 76 in order to evaluate the intensity or magnitude of the faults.

Additional fields of application for the present invention have been determined, by correlating a plurality of polarimeters as to time, as elucidated in the following text.

Figure 5:
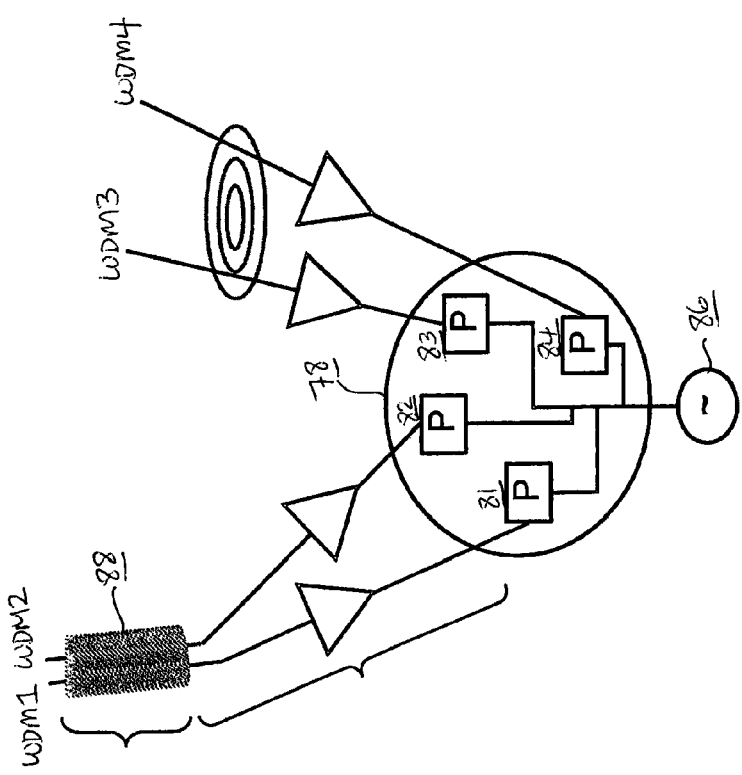
FIG. 5 shows a schematic illustration of a node having a node degree that is greater than 2.

FIG. 5 shows a network node 78 in which four transmission systems WDM1 to WDM4 come together. In network node 78, i.e., at the respective end, lying downstream from the signal, of transmission systems WDM1 to WDM4, a polarization measurement may be implemented with the aid of polarimeters 81 to 84, according to the exemplary embodiment in FIG. 1. Thus, the changes in polarization of transmission systems WDM1 to WDM4 coming from different directions may be measured. Polarimeters 80 to 84 are connected to a shared clock pulse supply 86, such as the clock network of the synchronous digital hierarchy (SDH), or to a shared GPS clock. Using this reference clock 86, which is connected to polarimeters 81 to 84, points in time may be assigned to the measured temporal changes in the states of polarization of different transmission systems. This may be implemented as absolute point in time or relative to the measured changes in the state of polarization at the other polarimeters. In this manner, simultaneously occurring, similar events may be temporally correlated to each other and thereby possibly be identified as large-area faults.

FIG. 5 shows two examples for the information to be obtained from this correlation of the polarization measuring signals.

The two different WDM transmission systems WDM1 and WDM2, on the left in the illustration, are guided in a shared cable 88 in a first region A. In a second region B, the two transmission systems WDM1 and WDDM2 run in separate spaces. If a fault occurs in the region of shared guidance A, the changes in polarization measured by polarimeters 81 and 82 are temporally correlated as well and will be detected as such. This makes it possible to determine that the fault has occurred in the region of shared guidance A. On the basis of often occurring correlated changes in the polarization, it is thus even possible to identify unknown and undesired shared guidances in WDM systems in shared cables. A shared guidance may also mean that two cables run inside the same trench. On the other hand, if no correlation exists among occurring changes in polarization between system WDM1 and system WDM2, it may be concluded that the associated faults have occurred in second region B, where no shared guidance is provided. That is to say, WDM systems for shared guidance may be selectively tested for shared guidance in this manner, by inducing mechanical faults on the cables, such as vibrations having predetermined characteristics, for instance a predefined frequency, and determining, on the basis of the presence or absence of correlations of the changes in polarization between systems WDM1 and WDM2, whether or not systems WDM1 and WDM2 are jointly guided at the location where the fault was induced.

If two WDM systems, e.g., WDM3 and WDM4, are actually not guided jointly, it is possible to detect whether the fault was caused by an event that occurred across a large area, such as an earthquake, from the temporal correlation of the changes in polarization measured at the different polarimeters 83 and 84. If the two WDM systems WDM3 and WDM4 were installed on a bridge, there is also the possibility that the fault was caused by vibration of the bridge. This, too, may be determined with the aid of the temporal correlation of the state of polarization functions at polarimeters 83 and 84.

Transmission systems and their network elements generally have a bidirectional configuration. WDM and SDH systems have a bidirectional design as a matter of principle.

Figure 6:
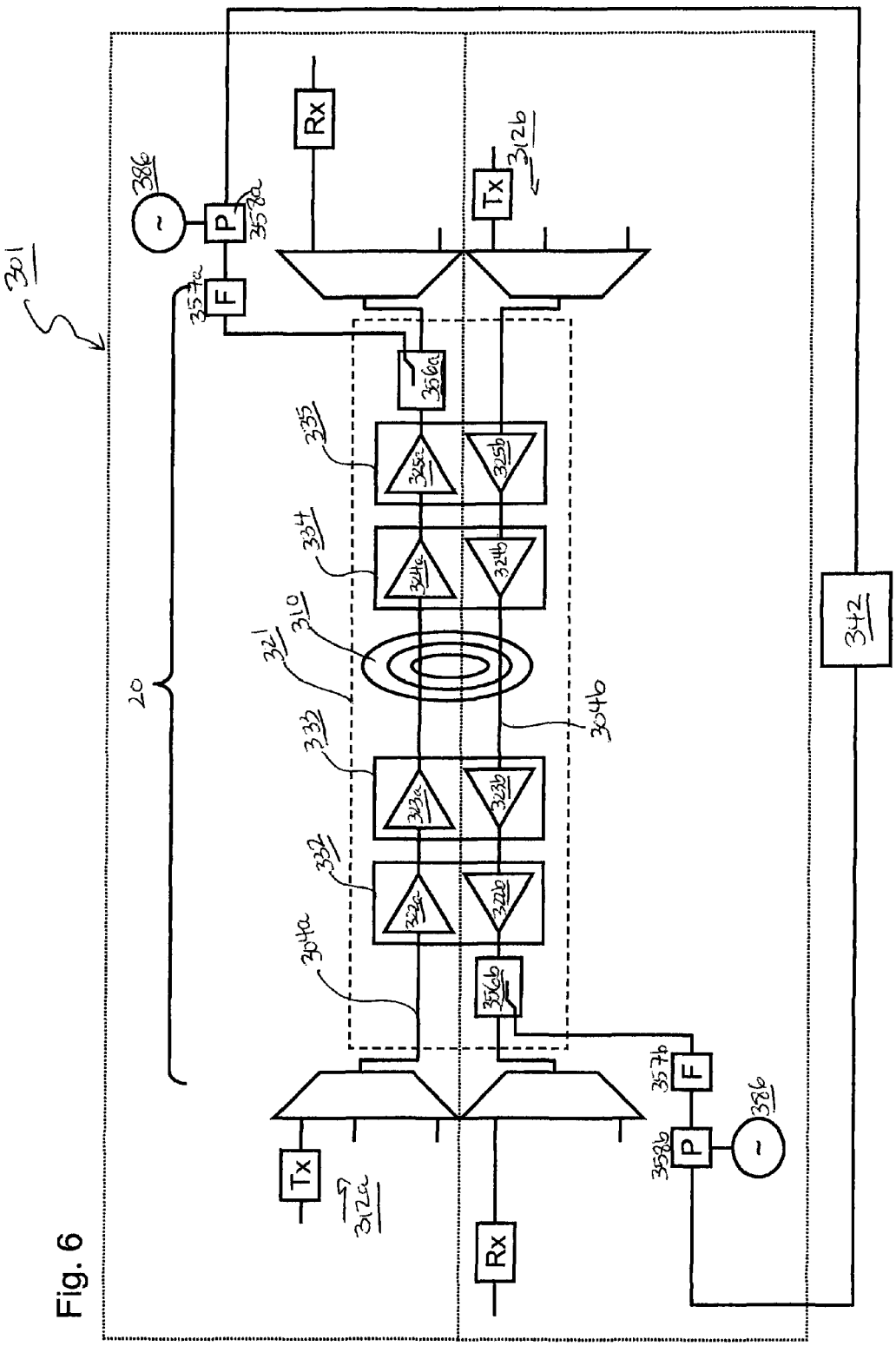
FIG. 6 shows a schematic representation of a bidirectional transmission system configured for the localization of faults according to an embodiment of the present invention.

FIG. 6 shows an example of a bidirectional WDM system 301. WDM transmission system 301 encompasses a first transmission path for forward direction 302a, and a second transmission path for return direction 302b. Glass fiber 304a of the forward direction and glass fiber 304b of the return direction lie in one and the same cable in region 321 of transmission path 20. As a result, faults in glass fibers 304a and 304b may spread in both directions. Two adjacent glass fibers 304a and 304b may be used for the forward and return direction of WDM system 301. Optical amplifiers 322a through 325a of the forward direction, and 322b through 325b of the return direction are each integrated in a paired manner in a shared network element 332 through 335.

At the end of the particular direction, the polarization measuring signal is decoupled with the aid of an individual coupler 356a, 356b and transmitted to a separate polarimeter 358a, 358b connected thereto, by means of an individual filter 357a, 357b.

As a result, light is injected at a first location 312a of the transmission path of forward direction 302a and at a first location 312b of the transmission path of return direction 302b, and the light is decoupled at a second location 356a, lying downstream from the signal, of the transmission path of forward direction 302a, and at a second location 356b, lying downstream from the signal, of the transmission path of return direction 302b. The system thus has a mirror-symmetrical configuration.

Then, the arrival time of the change in polarization at both polarimeters 358a and 358b is determined with the aid of shared clock pulse supply 386. As an alternative to shared clock pulse supply 386, the absolute arrival time of the change in polarization may also be determined with the aid of a receiver based on the GPS system or with the aid of the time, which is distributed over short wave in Germany, for example.

That is, when the two polarimeters have sufficiently precise absolute clock or time information, as is the case here, the arrival instant of fault 310 is able to be determined absolutely and relative to each other at both polarimeters 358a, 358b.

To this end, using a central evaluation device 342, which is connected to both polarimeters 358a, 358b, the time function of the states of polarization at both polarimeters is compared in order to be able to assign the corresponding signals to a particular fault. The difference in the arrival times of this fault is then measured at both polarimeters 358a and 358b. The location of the fault is calculated from the difference in the arrival times, given knowledge of the overall length of the measuring path or the distance between both polarimeters 358a and 358b, using the formula $$s_1 = \frac{S - (t_2 - t_1)c_n}{2} \quad (1)$$

In this context, $S_1$ is the path section between polarimeter 358a and the fault, S is the distance between both polarimeters 358b and 358a, $t_2-t_1$ is the difference in the arrival times between both polarimeters 358b and 358a, $C_n$ is the propagation speed of the light in the transmission medium.

Distance S between the two polarimeters and propagation speed cn are known constants. In this calculation the accuracy of the localization of the fault depends on the accuracy of the available time measurement. The clock accuracy of the SDH network lies at $10^{-11}$ when supplied by the central clock pulse. This means that the error in localization Äs is a function of the accuracy of the measurement of the arrival times of the fault at the two polarimeters. It is affected by the bandwidth of the utilized polarimeters and the speed of the fault. As far as the speed of the fault is concerned, time period Ät is decisive, while the amplitude of the fault is clearly identifiable from the noise of the transmitting and receiving system, i.e., especially the steepness of the rising flank of the polarization measuring signal. The result is $$Äs = c_n * Ät. \quad (2)$$

In the indicated example the detection time of a fault is approximately Ät=100 μs, in accordance with FIG. 4. This results in a spatial resolution in the order of magnitude of Äs=20 km. The time resolution of utilized polarimeter A1000 is sufficient so that no deterioration of the spatial resolution results therefrom.

The method according to the present invention may be utilized in across a large area in a transport platform, all collecting information of the polarimeters being connected as additional platform to the already present network management system, at its already existing interfaces, so that all fault information is centrally collected in this manner.

What is claimed is:

1. A method for detecting faults in a transmission path, having at least one optical fiber, of an optical transmission system, comprising:

injecting light having an input state of polarization into the transmission path at a first location of the transmission path;

decoupling the light at a second location of the transmission path, the first and second locations being spaced apart from each other so that the light decoupled at the second location has passed through at least one section of the transmission path;

measuring a state of polarization of the decoupled light in a manner resolved as to time;

determining a temporal change in the state of polarization of the decoupled light;

detecting an external influence on the optical fiber in response to the temporal change in the state of polarization of the decoupled light; and evaluating using an evaluation device connected to at least two polarimeters, a time function of a respective state of polarization at each of the at least two polarimeters is compared in order to assign a corresponding signal to a specific fault, where a location of the specific fault is calculated using:

$$s_1 = \frac{S - (t_2 - t_1)c_n}{2}$$

where $S_1$ is a path section between one of the at least two polarimeters and the fault, S is a distance between the at least two polarimeters, $t_2-t_1$ is a difference in arrival times between the at least two polarimeters, and $C_n$ is a propagation speed of the light in a transmission medium.

2. The method of claim 1, wherein the state of polarization of the decoupled light is measured continuously, and predefined parameters of the state of polarization are determined as a function of time.

3. The method of claim 1, further comprising determining Stokes parameters of the state of polarization of the decoupled light.

4. The method of claim 1, further comprising:

implementing a Fourier analysis of the Stokes parameters to determine the included frequency components; and filtering according to predefined frequency components takes place.

5. The method of claim 1, further comprising:

measuring amplitudes of the Stokes parameters; and determining an intensity of a fault using the measured amplitudes.

6. The method of claim 1, wherein the transmission system is an installed wave division multiplex system, and the optical signals utilized for the transmission of information are used as the light for measuring the state of polarization, so that a portion of the output of the optical signals used for the transmission of information is decoupled at the second location and the state of polarization of the optical signals is measured after having passed through the at least one section of the transmission path.

7. The method of claim 1, wherein a separate laser is used for the injection of light at the first location, and the light of the separate laser is decoupled at the second location and used for measuring the state of polarization.

8. The method of claim 7, wherein a wavelength of the separate laser lies in the amplifier band of the transmission system, and the separate laser operates in continuous light operation.

9. The method of claim 7, wherein the transmission system is an installed wave division multiplex system in which a plurality of transmission channels is multiplexed at the input of the transmission path and demultiplexed at the output of the transmission path, and the laser is coupled in at the input of the multiplexer.

10. The method of claim 1, wherein the transmission system is an installed wave division multiplex system in which a plurality of transmission channels is multiplexed at the input of the transmission path and demultiplexed at the end of the transmission path, and the light for measuring the state of polarization is decoupled within the transmission path between multiplexer and demultiplexer and filtered with the aid of an optical filter.

11. The method of claim 10, further comprising decoupling the light for measuring the state of polarization at the location of an optical amplifier in the transmission path.

12. The method of claim 1, wherein the transmission system is an installed wave division multiplex system in which a plurality of transmission channels is multiplexed at the input of the transmission path and demultiplexed at the output of the transmission path, and the light for measuring the state of polarization is decoupled at the output of the demultiplexer.

13. The method of claim 1, wherein light is decoupled from a plurality of individual transmission systems, and the state of polarization of the respective light is measured in a manner resolved as to time using an individual polarimeter, the polarimeters being synchronized by a shared clock pulse supply, and a temporal correlation between the states of polarization being determined at the polarimeters.

14. The method of claim 1, wherein the transmission system has a bidirectional design, and further comprising:
measuring the states of polarization in a manner resolved as to time at both sides of the transmission system for the forward and return direction using an individual polarimeter;
synchronizing the at least two polarimeters as to time; and
calculating a location of external influence along the transmission path in response to a relative arrival time of an identifiable rapid change in the state of polarization at the two sides.

15. The method of claim 14, wherein the location of the external influence along the transmission path is calculated using the time difference of the individual arrival time of the change in the state of polarization at the two sides of the transmission path, the length of the measuring paths and the transmission speed of the optical fiber.

16. The method of claim 1, wherein a normal cycle of one of the transmission system, a GPS signal, and a radio signal, is used for synchronizing the at least two polarimeters.

* * * * *